US012788537B2

(12) United States Patent
Blay et al.

(10) Patent No.: US 12,788,537 B2
(45) Date of Patent: Nov. 10, 2026

(54) PROSTHETIC COMPONENT AND PROCESS TO MANUFACTURE A PROSTHETIC COMPONENT BY ADDITIVE MANUFACTURING MEANS

(71) Applicant: M3 HEALTH INDÚSTRIA E COMÉRCIO DE PRODUTOS MÉDICOS, ODONTOLÓGICOS E CORRELATOS S.A., Jundiai (BR)

(72) Inventors: Alberto Blay, São Paulo (BR); Jamil Awad Shibli, Guarulhos (BR); Samy Tunchel, São Paulo (BR); Elaine Yoshiko Matsubara, São Paulo (BR); Luiz Antônio Saska Junior, Araraquara (BR); Alex Araújo Nucini, Santa Rosa de Viterbo (BR); Sybele Saska Specian, Santana de Parnaiba (BR)

(73) Assignee: M3 HEALTH INDÚSTRIA E COMERCIO DE PRODUTOS MEDICOS, ODONTOLÓGICOS E CORRELATOS S.A., Jundiai (BR)

( * ) Notice: Subject to any disclaimer, the term of this patent is extended or adjusted under 35 U.S.C. 154(b) by 134 days.

(21) Appl. No.: 18/720,727

(22) PCT Filed: Dec. 16, 2022

(86) PCT No.: PCT/BR2022/050508
§ 371 (c)(1),
(2) Date: Jun. 17, 2024

(87) PCT Pub. No.: WO2023/108247
PCT Pub. Date: Jun. 22, 2023

(65) Prior Publication Data

US 2025/0090282 A1 Mar. 20, 2025

(30) Foreign Application Priority Data

Dec. 17, 2021 (BR) .......................... 1020210255331

(51) Int. Cl.
*A61C 8/00* (2006.01)
*A61C 13/00* (2006.01)

(52) U.S. Cl.
CPC .......... *A61C 8/0068* (2013.01); *A61C 8/0013* (2013.01); *A61C 8/0054* (2013.01);
(Continued)

(58) Field of Classification Search
CPC ........ A61C 8/005–0074; A61C 8/0068; A61C 8/0013; A61C 8/0054; A61C 8/0056;
(Continued)

(56) References Cited

U.S. PATENT DOCUMENTS

| | | | |
|---|---|---|---|
| 5,334,024 | A | 8/1994 | Niznick |
| 2004/0265781 | A1 | 12/2004 | Coatoam |

(Continued)

FOREIGN PATENT DOCUMENTS

| | | |
|---|---|---|
| BR | MU 8803126-8 | 9/2010 |
| BR | MU 8803077 | 3/2011 |
| DE | 10 2020 001313 | 9/2021 |

OTHER PUBLICATIONS

International Search Report for PCT/BR2022/050508 dated Mar. 9, 2023.

(Continued)

*Primary Examiner* — Matthew M Nelson
(74) *Attorney, Agent, or Firm* — Klarquist Sparkman, LLP

(57) ABSTRACT

The present invention discloses a prosthetic component to be used in a dental implant. More precisely, the present invention relates to a prosthetic component manufactured by additive manufacture means. Furthermore, the present invention refers to a process to manufacture a prosthetic component through additive manufacturing mans. The prosthetic component (1) for a dental prosthesis being coupled to an osseointegrable implant (20) and a prosthesis (30), the component comprises a superior portion (2), an intermediate portion (3) and a lower portion (4); the upper portion (2) further comprising a cylindrical projection (5), which comprises a cavity (6); the lower portion (4) comprises an
(Continued)

adaptation base (7), wherein at the lower end of the adaptation base (7) a threaded projection (8) is arranged; wherein the intermediate portion comprises a rough, porous surface; and the component is made by additive manufacturing means.

11 Claims, 10 Drawing Sheets

(52) U.S. Cl.
CPC ............ *A61C 8/0056* (2013.01); *A61C 8/006* (2013.01); *A61C 8/0069* (2013.01); *A61C 13/0004* (2013.01); *A61C 13/0019* (2013.01); *A61C 2008/0046* (2013.01)

(58) Field of Classification Search
CPC .................. A61C 8/006; A61C 8/0069; A61C 13/0004; A61C 13/0019; A61C 2008/0046; B33Y 40/20; B33Y 80/00
USPC ....................................................... 433/201.1
See application file for complete search history.

(56) References Cited

U.S. PATENT DOCUMENTS

| | | | | |
|---|---|---|---|---|
| 2011/0097689 | A1 | 4/2011 | Thome | |
| 2011/0200969 | A1* | 8/2011 | Schroering | A61C 8/005 433/174 |
| 2012/0237899 | A1* | 9/2012 | Holmstrom | A61C 8/0001 433/201.1 |
| 2014/0272791 | A1* | 9/2014 | Sanchez | A61C 8/0012 433/173 |
| 2018/0092911 | A1 | 4/2018 | Lebel | |
| 2018/0161128 | A1 | 6/2018 | Smith et al. | |
| 2020/0100874 | A1* | 4/2020 | Ruetschi | A61F 2/30767 |
| 2020/0138552 | A1 | 5/2020 | Jorneus et al. | |
| 2021/0068931 | A1* | 3/2021 | Thomke | A61C 8/0021 |
| 2021/0153982 | A1* | 5/2021 | Wernle | A61C 13/0018 |
| 2021/0251726 | A1* | 8/2021 | Fadeev | A61C 8/0013 |
| 2021/0330431 | A1* | 10/2021 | Yang | A61C 8/006 |
| 2022/0151745 | A1* | 5/2022 | Mercelis | A61C 13/0019 |
| 2022/0249208 | A1* | 8/2022 | Chenaux | A61C 8/0027 |
| 2022/0387143 | A1* | 12/2022 | Wysocki | B33Y 80/00 |
| 2023/0008452 | A1* | 1/2023 | Park | A61L 27/56 |
| 2023/0263600 | A1* | 8/2023 | Chenaux | A61C 8/005 433/173 |

OTHER PUBLICATIONS

Written Opinion of the International Searching Authority for PCT/BR2022/050508 dated Jun. 22, 2023.
Yuva Sasada. "Implant-Abutment Connections: A review of Biological consequences and Peri-Implantitis Implications" ( The International Journal of Oral and Maxillofacial Implants, vol. 32, n 6, 2017); Abstract only.
Joanes Silva Santos; "One abutment and one time concept for platform-switched morse implants: Systematic review and metaanalysis" (Brazilian Dental Journal, 29(1 ): 7-13, 2018).

* cited by examiner

PROSTHETIC COMPONENT AND PROCESS TO MANUFACTURE A PROSTHETIC COMPONENT BY ADDITIVE MANUFACTURING MEANS

TECHNICAL FIELD

The present invention discloses a prosthetic component to be used in a dental implant. More precisely, the present invention refers to the prosthetic component manufactured by additive manufacture.

Also, the present invention refers to a manufacturing process of the prosthetic component through additive manufacturing.

BACKGROUND OF THE INVENTION

Currently, dental implants are the most modern way to definitively rehabilitate teeth that have been lost. Dental implants replace the root of the lost dental element and are composed of titanium screws that are implanted in the bone and on them are cemented or bolted prostheses in composite resin, porcelain or zirconia (or both). A prosthetic component is provided between the dental implant screw and the prosthesis.

The prosthetic components are currently produced by machining, such as using CNC (Computer numerical Numerical Control) technology. The machined prosthetic components comprise a smooth area, which comes into contact with transmucous tissue (gums). However, such machined components have the drawback that the smooth area does not favor the gum's adhering to the component, favoring the proliferation of bacteria, peri-implantitis and, consequently, implant loss.

Below are some state-of-the-art documents belonging to the field of invention.

Document MU8803077 refers to a single-body mini-pilar. More precisely, the mini-pillar comprises a body formed with a fixed screw in a single piece, in this way the installation process is simplifying. Furthermore, the mini-pilar eliminates or the channel that previously generated fragility to the product and made it susceptible to fractures, causes of clinical problems and difficult maintenance.

Document MU 8803126-8 refers to a system of prosthetic components, including mini-pillar, which aims at universal fitting, regardless of the type and size of implant used.

Document U.S. Pat. No. 5,334,024 refers to a pillar adapted for use with a dental implant equipped with a hollow tubular limb of a size and shape adapted for use with a pillar or insert and includes irregularities in its external surface that are adapted to engage molten metals in it. The tubular limb has a fixation limb to engage a complementary fixation limb in the dental implant at one end.

Document MU8800606-9 refers to a mini-pilar morse cone equipped with a characteristic connection, which allows a connection to the conical cavity of a dental implant.

Document US 2018/0092711 refers to a system comprising a dental implant and a replacement ring. The dental implant has an insertion part for anchoring in a mandible. The replacement ring is used to replace a subtractive removable annular material region in a coronal region of the insertion part.

Document US 2004/0265781 refers to a dental implant equipped with an elongated body with first and second parts of extremity and having a root in an end part to attach to a patient's jawbone to replace the root of a removed tooth. The root part has an anatomical-shaped serving between the end parts of the body to fit an opening of the jawbone below a patient's gum tissue when the root is attached to a jawbone. An artificial tooth pillar is formed at the other end of the elongated body to fix an artificial tooth on the pillar that extends above a patient's gum line.

Document US 2020/0138552 refers to a pillar system comprising: a soft tissue level column part adapted to be fixed to a bone level dental implant by means of a pillar screw, in which the pillar system it is adapted to selectively support both a cemented final restoration and a screwed prosthetic component.

The document *Implant-Abutment Connections: A review of Biological consequences and Peri-Implantitis Implications* (*The International Journal of Oral and Maxillofacial Implants*, vol 32, n 6, 2017) refers to a study on marginal bone loss around dental implants at the level of the crest shortly after implant placement and removal. The first clinical publications suggest that bone loss occurs during the first year of loading.

The document *One abutment and one time concept for platform-switched morse implants: Systematic review and meta-analysis* (*Brazilian Dental Journal,* 29(1): 7-13, 2018) refers to a comparative study on peri-implant vertical bone loss of immediate load of implant crowns using the one pillar-at-a-time protocol (AOT) and implants with pilar removal (AR).

Therefore, there is no solution equivalent to that presented here in the present invention in which the prosthetic component is manufactured by additive manufacturing, and which comprises rough surface intrinsic to the process, in order to improve the adhering of gum and periodontal tissues to the component.

INVENTION OBJECTIVES

Thus, it is an objective of the present invention to provide prosthetic component that is manufactured by additive manufacture.

It is another of the objective of the present invention to provide a prosthetic component that comprises a superficial structure morphologically with controlled and rougher geometry, in order to improve the component-tissue-periodontal/gingival.

SUMMARY

The present invention achieves these and other objectives by means of a prosthetic component for a dental prosthesis, the prosthetic component being coupled to an osseointegrated implant and a prosthesis, the component comprises a superior portion, an intermediate portion and a lower portion; the upper portion being endorsed with a cylindrical projection, comprising a cavity; the lower portion comprises a base, where at one end of the adaptation base is arranged a threaded projection; the intermediate portion comprises a rough surface intrinsic to the process; and the component is printed by additive manufacturing.

The present invention achieves these and other objectives through a process of manufacturing a prosthetic component as defined above, the process comprises the steps of: defining the type of prosthetic component to be used in the dental prosthesis; perform printing of the selected prosthetic component through additive manufacturing; cylindrical projection and the adaptation base.

BRIEF DESCRIPTION OF THE DRAWINGS

The present invention will be described on the basis of the attached drawings here, which illustrate.

DETAILED DESCRIPTION OF THE INVENTION

The present invention refers to a prosthetic component 1 for a dental prosthesis. Prosthetic component 1 is coupled to an osseointegrable implant 20 and a prosthesis 30.

Figure 1:
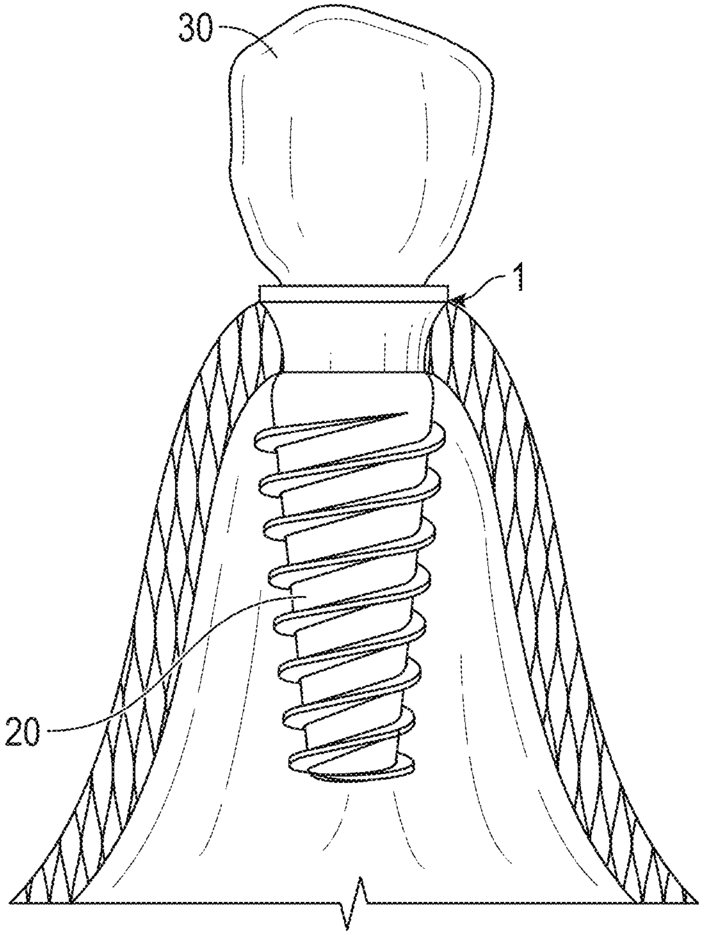
FIG. 1 illustrates a cut view of a dental prosthesis comprising an osseointegrable implant, a prosthetic component and a prosthesis.
Figure 2:
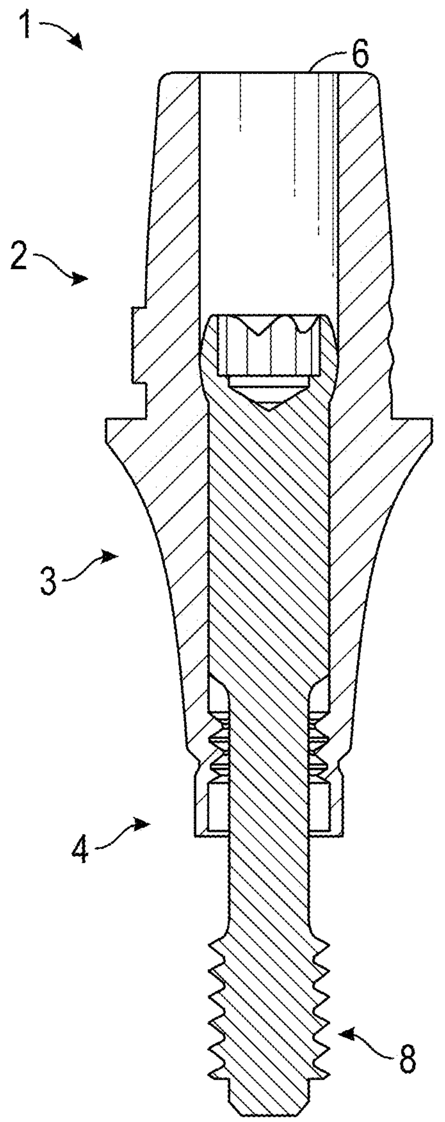
FIG. 2 illustrates an exploded view of a prosthetic component and an implant.
Figure 3:
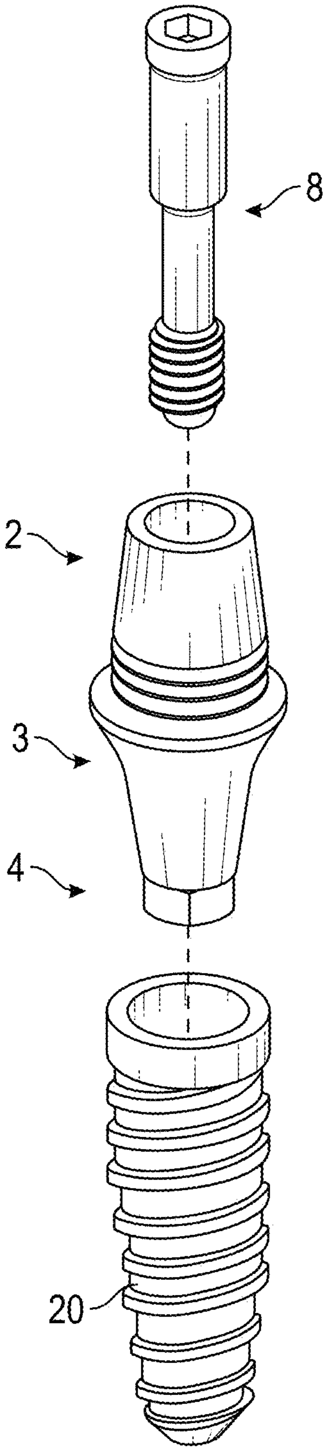
FIG. 3 illustrates a cut view of the prosthetic component.

More precisely, as shown in FIG. 1, the osseointegrable implant 20 is screwed into the patient's bone (place where the tooth was lost), then the prosthetic component 1 is screwed in implant 20 and, finally, the dental prosthesis 30 is attached to component 1.

The prosthetic component of the present invention can be a pillar, mini pillar, component, base and any component equivalent to these present in a dental prosthesis.

Figure 4:
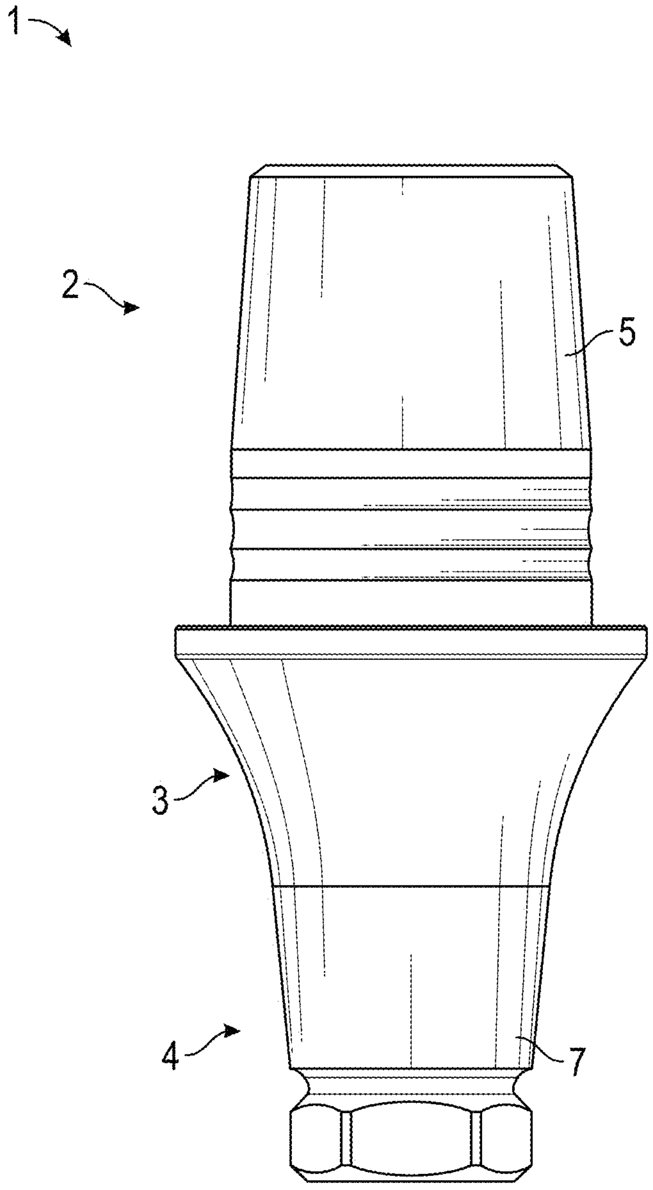
FIG. 4 illustrates a frontal view of the prosthetic component.

In a preferred embodiment, the component comprises a upper portion 2, an intermediate portion 3 and a lower portion 4, as seen in FIG. 4.

Threaded projection 8 aims to fix component 1 to the osseointegrable implant 20, when component 1 is screwed into the implant 20.

The prosthetic component 1 of the present invention has the advantage of being manufactured by additive manufacture. Thus, it is possible to have a better control of the porosity and roughness of the components, mainly the roughness of the surface of the intermediate portion 3.

After being produced by additive manufacturing, prosthetic component 1 has cylindrical projection 5 of the upper portion 2 and the adaptation base 7 of the lower 4 machined portion, keeping only the intermediate portion 3 rough, so it is possible that the prosthetic component 1 has an optimal gum tissue adhering, in addition to minimizing the occurrence of the peri-implantitis process, advantages that cannot be found in the existing components in the art.

It should be noted that in a preferred embodiment the intermediate portion 3 has a tronconic format.

Figure 5:
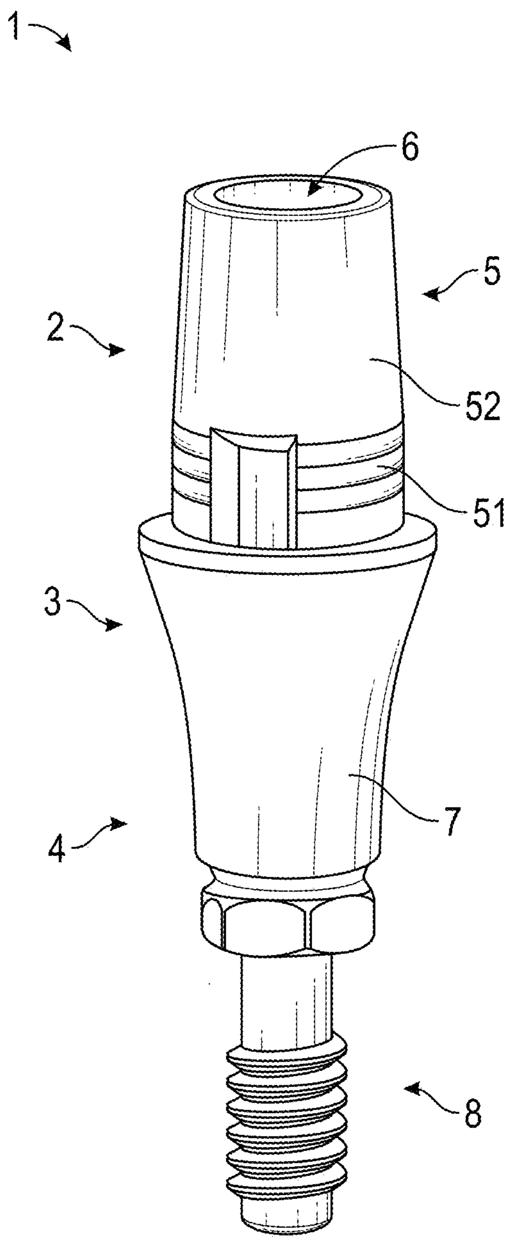
FIG. 5 illustrates a perspective view of a first embodiment of the prosthetic component.

In addition, and in a first preferred embodiment as can be seen in FIG. 5, cylindrical projection 5 comprises a cylindrical portion 51 and a tronconic portion 52.

Figure 6:
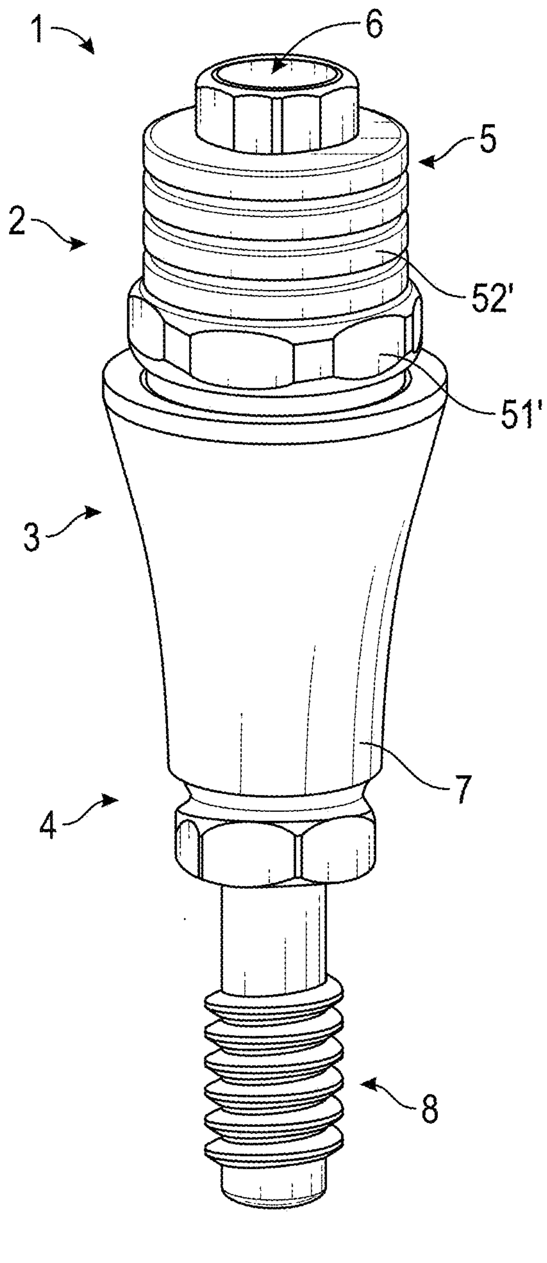
FIG. 6 illustrates a perspective view of a second embodiment of the prosthetic component.

In a second alternative embodiment, shown in FIG. 6, the cylindrical projection 5 comprises a hexagonal portion 51' and a 52' cylindrical portion.

Figure 7:
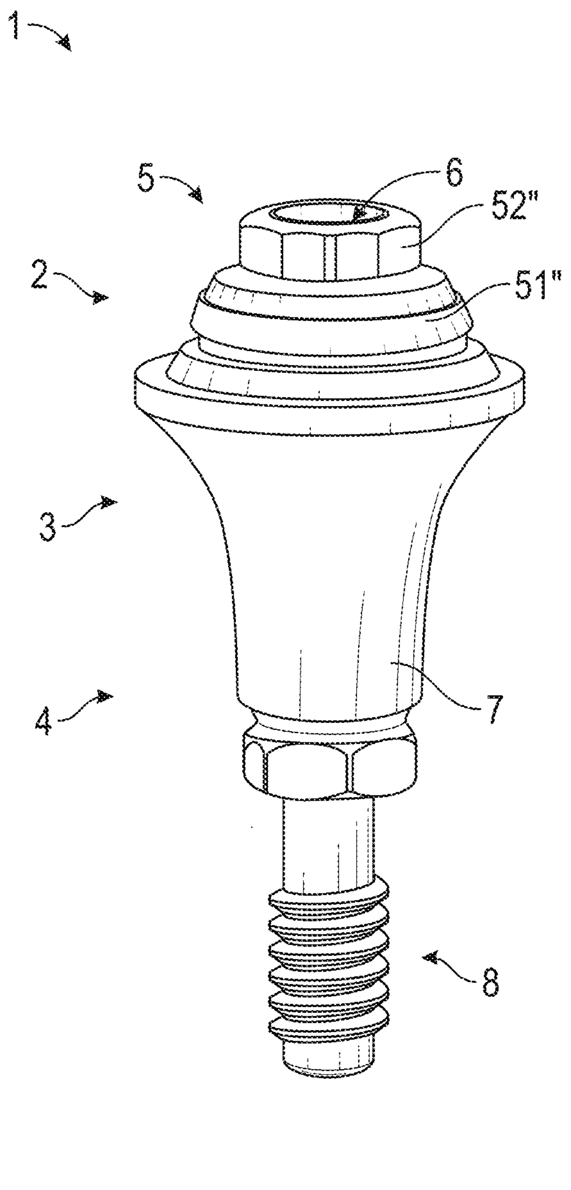
FIG. 7 illustrates a perspective view of a third embodiment of the prosthetic component.

In a third alternative embodiment, shown in FIG. 7, cylindrical projection 5 comprises a tronconic portion 51" and a hexagonal portion 52".

Figure 8:
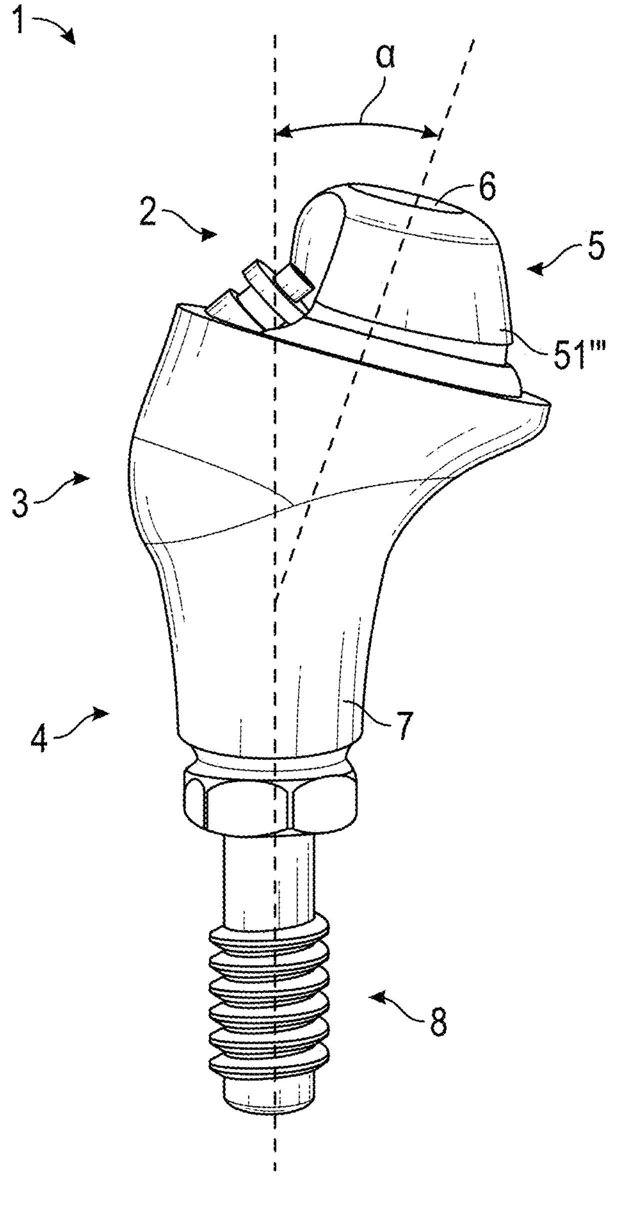
FIG. 8 illustrates a perspective view of a fourth embodiment of the prosthetic component.

In a fourth alternative embodiment, shown in FIG. 8, conical projection 5 comprises a tronconic portion 51". The upper portion 2 and the intermediate portion 3 are angled (a) in relation to a vertical axis, so that such portions are substantially displaced in relation to the lower portion 4.

Figure 9:
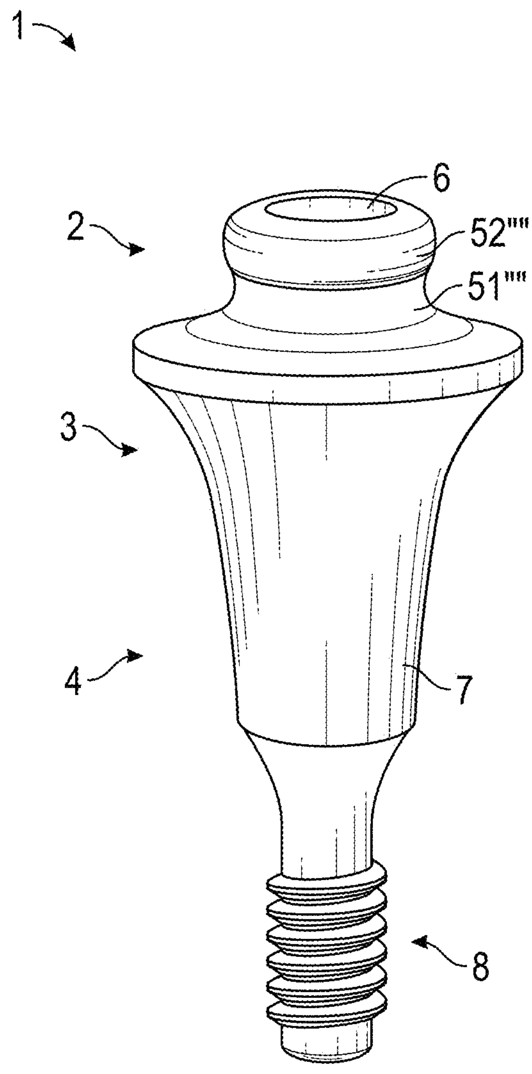
FIG. 9 illustrates a perspective view of a fifth embodiment of the prosthetic component.

In an alternative fifth embodiment, shown in FIG. 9, cylindrical projection 5 has a first cylinder 51"" and a second spherical cylinder 52", such that preferably the first cylinder 51"" has a smaller diameter than the second cylinder 52".

Figure 10:
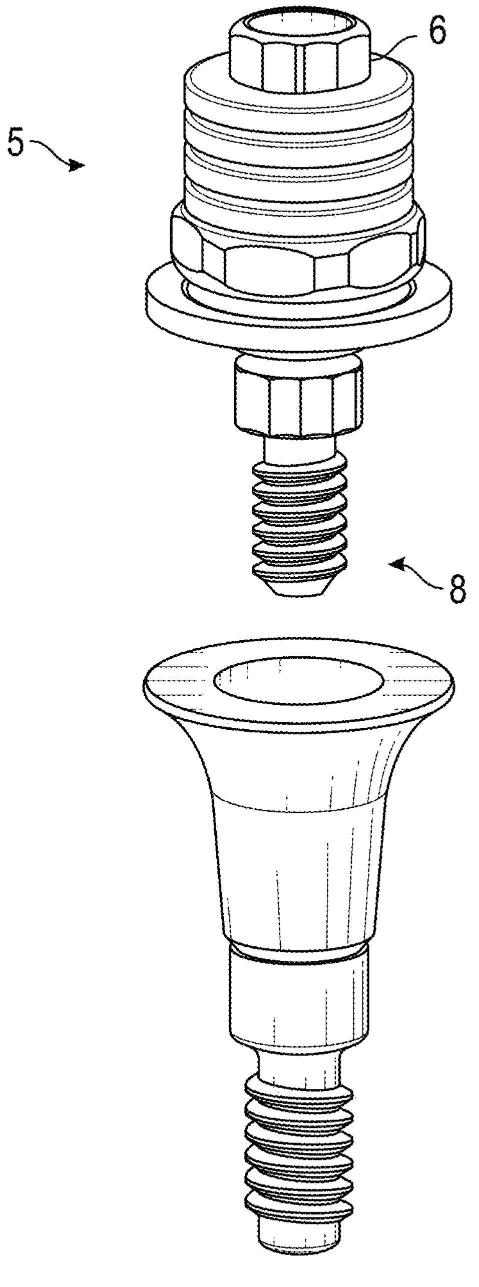
FIG. 10 illustrates a perspective view of a sixth embodiment of the prosthetic component.

Furthermore, in a sixth alternative embodiment shown in FIG. 10, the upper projection 5 can contemplate the alternatives presented in the upper portions 5 of the previous embodiments of the object of the present invention and the lower portion 4 being fixed to the dental implant 20.

According to the embodiment of FIG. 10, the upper portion 2 preferably comprises a cylindrical projection 5, said cylindrical projection 5 comprising a cavity 6.

It should be noted that cylindrical projection 5 preferably has a substantially cylindrical shape. However, as can be seen in more detail below, other formats can be used, provided that such formats achieve the objectives of the present invention.

The cavity 6 has the purpose to be the place in which the prosthesis 30 will be fixed, in order to fix the entire set of the dental prosthesis.

More specifically, cavity 6 comprises a base, which serves as a pillar that is used definitively between implant 20 and prosthesis 30.

This definitive form preserves the stability of bone and soft tissues around the implant 20, thus minimizing post-surgical infection problems and improving the packaging of gingival tissue.

It should be noted that prosthetic component 1 is preferably made of titanium alloy. However, other types of materials can be used, such as titanium and its alloys, zirconia, polymers, etc., provided that the objectives of the present invention are achieved.

The prosthetic component 1 is manufactured by means of a manufacturing process comprising the following steps:

- define the type of prosthetic component 1 (such as the embodiments described above) to be used in connection with the dental implant;
- manufacturing of the selected prosthetic component 1 by means of additive manufacturing technologies;
- machining the cylindrical projection 5 and the adaptation base 7, maintaining the intermediate portion, that is, the rough transmucosal height, coming from the additive manufacturing process.

In a preferred embodiment of the present invention, the manufacturing process further comprises the following steps:

- preliminary preparation of a component or selection of available components;
- analysis of the desired location of the implant by, for example, morphological analysis by imaging examinations such as computed tomography of the indicated locale;
- obtaining patient data to verify integration needs;
- computer modeling of a porous surface texture comprising pore size, wall thicknesses and other characteristics of the component 1 surface; and
- reproduction of texture in a controlled manner by means of additive manufacturing technique.

The present invention presents numerous technical and economic advantages when compared to the state of the art, some of which are listed below:

The prosthetic component 1 is produced by additive manufacturing technology.

The prosthetic component 1 comprises a rough surface with controlled porosity/morphology, improving periodontal component-periodontal/gum tissues. Thus, the present invention has as advantage the controllable porosity and roughness of the components.

In addition, the present invention has the advantage of having a cleaner production plant. Specifically, the component machining process generates less than ⅓ of waste compared to the CNC manufacturing process as a whole. Such small residue is even cleaner than chip residue in conventional machining, since there is no oil contamination commonly used in this type of process, since the machining usage is minimal.

The technology of the present invention enables the manufacture of the prosthetic component with the desired characteristics in fine level of detail. It is possible to combine in the same component smooth and rough surface continuously, and this roughness is controlled by process parameters and specification of the raw material, which is not possible with conventional CNC methods. This technology is applicable for various forms of parts providing standardization of parts, homogeneous distribution of roughness on surfaces, significant reduction of residues which leads to reduction of production cost, quality assurance of portions with efficiency and reproducibility with more accuracy of surface topography.

Additionally, components manufactured by additive manufacturing can be coated with carbon nanostructure, such as graphene and/or carbon nanotubes to increase mechanical strength and add biological properties such as microbial ant.

Have been described an example of preferred embodiments of the present invention, it should be understood that the scope of the present invention covers other possible variations of the inventive concept described, being limited only by the content of the claims, including the possible equivalents.

The invention claimed is:

1. A prosthetic component for use with a dental implant and a dental prosthesis, comprising an upper portion, an intermediate portion, and a lower portion, wherein: (a) the upper portion includes a projection defining an internal cavity configured to receive the dental prosthesis; (b) the lower portion includes an adaptation base having a threaded projection configured to engage the dental implant; and (c) the intermediate portion is formed as an additively manufactured porous structure having a three-dimensionally interconnected pore network;

wherein the upper portion and the lower portion are machined to have substantially non-porous surfaces; and wherein the porous structure of the intermediate portion is intrinsic to the additive manufacturing process and is not formed by post-manufacturing surface treatment.

2. The prosthetic component of claim 1, wherein the porous structure of the intermediate portion is defined by additive manufacturing parameters including pore size and pore morphology selected during computer modeling of the prosthetic component.

3. The prosthetic component of claim 1, wherein the intermediate portion has a frustoconical shape.

4. The prosthetic component of claim 3, wherein the projection includes a cylindrical portion and a frustoconical portion.

5. The prosthetic component of claim 3, wherein the projection includes a hexagonal portion and a cylindrical portion.

6. The prosthetic component of claim 3, wherein the projection includes a frustoconical portion and a hexagonal portion.

7. The prosthetic component of claim 3, wherein the projection includes a frustoconical portion; and wherein a longitudinal axis of the upper portion is angled relative to a longitudinal axis of the lower portion.

8. The prosthetic component of claim 1, wherein the prosthetic component is manufactured of a titanium alloy.

9. The prosthetic component of claim 1, wherein the porous intermediate portion is coated with a carbon nanostructure selected from graphene and carbon nanotubes.

10. A process for manufacturing the prosthetic component of claim 1, comprising: (a) digitally modeling the prosthetic component including the porous intermediate portion and the non-porous upper and lower portions; (b) producing the prosthetic component by additive manufacturing such that the intermediate portion is formed with intrinsic porosity; and (c) machining only the upper portion and the lower portion to remove additive-manufacturing surface roughness.

11. The process of claim 10, further comprising coating the porous intermediate portion with a carbon nanostructure selected from graphene and carbon nanotubes.

* * * * *